Nov. 24, 1953     B. MacDONALD     2,660,189

PROTECTOR VALVE

Filed Sept. 28, 1948

INVENTOR
BERNARD MacDONALD

By Bailey, Stephens & Huettig
ATTORNEYS

UNITED STATES PATENT OFFICE 2,660,189

PROTECTOR VALVE

Bernard MacDonald, New Glasgow, Nova Scotia

Application September 28, 1948, Serial No. 51,533
Claims priority, application Canada
August 14, 1948

1 Claim. (Cl. 137—198)

This invention is concerned with an improved valve assembly and in particular with an improved control valve assembly for incorporation in a vacuum line capable of moving liquids.

The object of this invention is to provide a self-contained unit which may be connected between a vacuum creating equipment such as a vacuum pump or the manifold of an internal combustion engine, and the body of liquid to be acted upon by the vacuum. This novel unit contains means to shut off the vacuum when the container to be evacuated has filled with a liquid such as water, and in addition, means for maintaining the vacuum when the vacuum creating equipment is either stopped or between the pulsating strokes of the vacuum creating equipment. Means may also be conveniently incorporated to give a warning signal when rising liquid causes the closing off of the vacuum line. The unit may be designed to be adaptable to a wide variety of vacuum creating equipment and used for a variety of purposes.

The invention offers advantages over previous devices of a similar nature in that it provides a compact unit which closes off the connection between the tank or source of liquid and the vacuum creating equipment before liquid can enter the latter, thus insuring against possible breakdowns of the equipment in times of emergency, for example in fire fighting, when the unit may be used to connect the manifold of a truck or car to a tank which in turn is connected to a source of water such as a river or lake. This feature also prevents damage to the vacuum creating equipment, as many types of equipment are extremely vulnerable to liquid entering via the vacuum line.

The unit also provides means for holding the vacuum, an advantage which, to the knowledge of the inventor, no other similar unit offers, and yet it will frequently prove important as the majority of vacuum creating equipment, particularly when old and worn, suffers from a certain amount of leakage. Thus power is ordinarily wasted as it is necessary to run the equipment continuously to maintain the vacuum, and in addition there is the danger that the vacuum already created will be lost if the equipment fails during an emergency. Another application of this feature is the use of one vacuum creating unit to evacuate a succession of tanks, the vacuum in each being maintained by the unit which forms the subject matter of this invention. In certain types of evacuating equipment, there is a certain back pressure between strokes. The means provided for holding the vacuum also operates to prevent this pressure acting upon the evacuated tank or pipe.

The objectives described above are accomplished by means of a diaphragm with a central air passage or passages which may be closed off to give a positive seal against evacuation from either direction by means of valves operating under the influence of a buoyant device.

The apparatus constituting the present invention will be described in greater detail with the assistance of the accompanying description and with reference to the attached diagrams.

Figure 1:
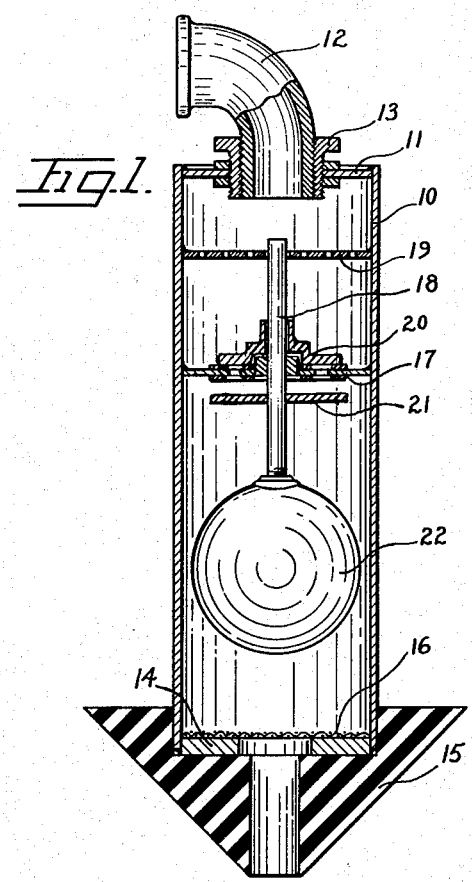
Figure 1 is an elevation view in section of the preferred embodiment of the invention.
Figure 2:
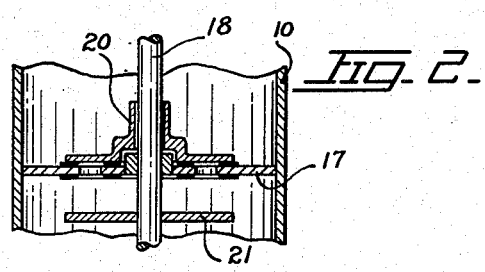
Figure 2 is an elevation view of a portion of Figure 1 on an enlarged scale.

In Figure 1, an embodiment of the invention is disclosed wherein the reference numeral 10 is a tubular shaped member which forms the outside container of the unit. The upper end is partially closed by a flat plate 11, a central opening being left for the insertion of a street L 12 or equivalent section of piping, which engages by means of a screw thread a bushing 13 attached to the plate 11. The lower opening is also restricted by a flat plate 14 with a central aperture. The lower end of the unit fits into a rubber adapter 15 which is cone-shaped and has a hollow axis which corresponds with the above mentioned central aperture. A screen 16 is positioned within the unit so as to cover the lower central aperture.

A rigid diaphragm 17 separates the unit into a lower and upper chamber and forms an airtight seal, except for a number of holes. The holes perform the function of allowing a vertical rod 18 to pass through the centre of the diaphragm and permitting the passage of air from one chamber to the other. Thus a tightly fitting central opening may be used and additional holes provided adjacent to the central opening. The vertical rod 18 is further supported by a web 19 which allows the free passage of air and the sole function of which is to support the rod 18. A flat disc or valve 20 is rigidly attached to the rod 18 above the diaphragm 17. A rubber gasket is attached to the under surface of the disc 20 to enable an air-tight seal to be made with the diaphragm 17, or alternatively the gasket may be attached to the upper surface of the diaphragm 17 to form a valve seat for the disc 20. Similarly a flat disc or valve 21 is rigidly attached to the rod 18 below the diaphragm 17 with an intermediate rubber gasket attached either to the disc 21 or the lower surface of the diaphragm 17. The discs 20 and 21 are spaced sufficiently far apart to allow vertical movement of the central rod 18.

At the lower end of the rod 18 is rigidly attached a float 22 which is centrally suspended in the lower chamber by means of the rod 18, sufficient space being allowed between the float 22 and the inner wall of the tubular container 10 to permit the free passage of air, and between the float 22 and the plate 14 for the vertical movement of the rod and float and for the free passage of air, and a space is allowed between the top of the float and the lower disc 21 to prevent liquid surrounding the float from splashing into the upper chamber above the diaphragm 17.

The operation of the embodiment of the invention described above is as follows:

Vacuum creating equipment is attached to the street L 12 or other connection. This draws air from the tank or pipe to be evacuated through the central bore of the rubber adapter 15 and through the central hole in the bottom plate 14 and the screen 16. The air passes between the float 22 and the inner side walls of the main container 10. When no liquid has entered the unit to raise the float 22 the air will then pass through the space between the valve 21 and the diaphragm 17 and then through the holes in the above mentioned diaphragm forcing the valve 20 upwards and with it the central rod 18, the float 22 and the other valve 21. Since only a small lift will be required to allow air to escape between the valve 20 and the diaphragm 17 into the upper chamber, the space between the valve 21 and the diaphragm 17 will only be partially closed. The air then passes freely past the web 19 and out through the street L 12 to the evacuating equipment.

When the vacuum creating equipment is closed off or breaks down or there is back pressure from it, the valve 20 seats against the diaphragm 17. A positive seal being maintained by the combined effect of the weight of the float, rod and discs and the vacuum which has already been created in the lower chamber, thus loss of vacuum is prevented.

The lower valve 21 operates to give a positive sealing action under different circumstances, namely when the liquid enters the lower chamber from the tank or pipe being evacuated. In this case the rising liquid forces the float 22 upwards and the valve 21 seats against the diaphragm 17. Further air and any liquid is thus prevented from entering the upper chamber by the positive sealing action maintained by the combined effect of the hydraulic lift of the float and the vacuum in the upper chamber exerted by the evacuating equipment.

I claim:

An apparatus for regulating the connection between evacuating equipment and a space to be evacuated comprising a hollow cylindrical member the ends of which are partially closed by plates welded or otherwise secured thereto, each plate having a central aperture, the said aperture in one of said plates being connected by means of a pipe to the said evacuating equipment, the other of said apertures in the other said plate being connected to the space to be evacuated, the interior of said hollow cylindrical member being divided unequally into an upper and a lower chamber by a circular plate arranged at right angles to the axis of the cylinder and being hermetically sealed to the cylinder walls along its circumference, said plate having a central aperture and a plurality of secondary apertures spaced about and close to said central aperture to provide a means of communication between the said two chambers, a second circular plate spaced from said first plate and lying in the upper chamber having a central aperture aligned with the central aperture in said first mentioned plate and a plurality of further apertures to provide unrestricted passage of fluid therethrough, a float in said lower chamber having a rod extending from it and passing through the central apertures of both said plates, a disc secured to said shaft at right angles to the axis of said shaft, said disc being of a diameter sufficiently great to cover said secondary apertures when lying on said first circular plate, a similar disc secured to said shaft below said first circular plate and spaced therefrom, all of said above mentioned parts being inaccessible from the exterior of the chamber and incapable of being acted upon by an exterior force.

BERNARD MacDONALD.

References Cited in the file of this patent

UNITED STATES PATENTS

| Number | Name | Date |
|---|---|---|
| 540,760 | Sawyer | June 11, 1895 |
| 753,764 | Vanneman | Mar. 1, 1904 |
| 812,451 | Rice | Feb. 13, 1906 |
| 1,154,385 | Davis | Sept. 21, 1915 |
| 1,213,831 | Bottum | Jan. 30, 1917 |
| 1,294,002 | Weatherhead | Feb. 11, 1919 |
| 1,450,245 | Browne | Apr. 3, 1923 |
| 1,967,383 | Turgot | July 24, 1934 |
| 2,325,956 | Holtman | Aug. 3, 1943 |
| 2,362,327 | Lipton | Nov. 7, 1944 |
| 2,484,102 | Le Valley | Oct. 11, 1949 |